Figure 1:
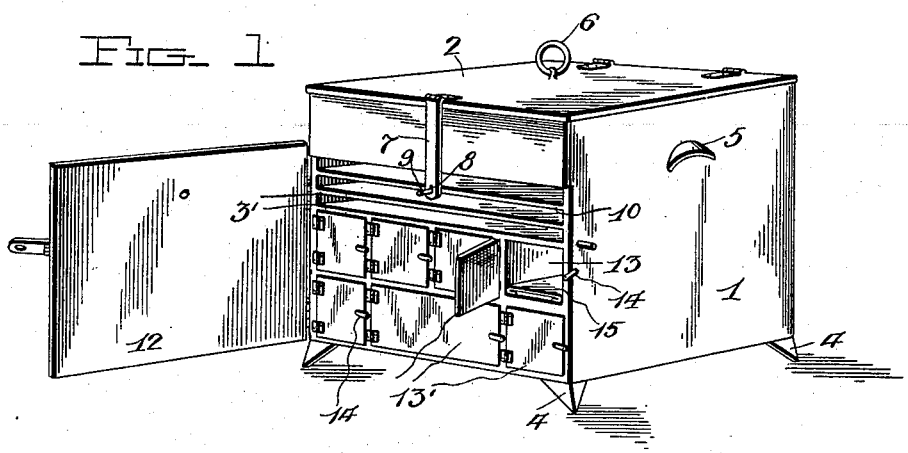

No. 655,116. Patented July 31, 1900.
N. E. RAND.
CAKE BOX.
(Application filed June 1, 1899. Renewed May 17, 1900.)

(No Model.)

Inventor
Nellie E. Rand,

Witnesses
by
H. B. Willson & Co.
Attorneys

UNITED STATES PATENT OFFICE.

NELLIE E. RAND, OF SOUTH WINDHAM, MAINE.

CAKE-BOX.

SPECIFICATION forming part of Letters Patent No. 655,116, dated July 31, 1900.

Application filed June 1, 1899. Renewed May 17, 1900. Serial No. 16,988. (No model.)

*To all whom it may concern:*

Be it known that I, NELLIE E. RAND, a citizen of the United States, residing at and whose post-office address is South Windham, in the county of Cumberland and State of Maine, have invented certain new and useful Improvements in Cake-Boxes; and I do declare the following to be a full, clear, and exact description of the invention, such as will enable others skilled in the art to which it appertains to make and use the same.

My invention relates to improvements in cake safes or canisters.

The object of the invention is to simplify the construction, increase the efficiency, and provide an inexpensive, effective, and durable device of this character for keeping cakes, pies, and the like fresh and free from foreign matter for an indefinite period of time.

To this end the invention consists in the construction, combination, and arrangement of the several elements of the device, as will be hereinafter more fully pointed out in the claims.

In the accompanying drawings the same reference characters indicate the same parts of the invention in the several views.

Figure 2:
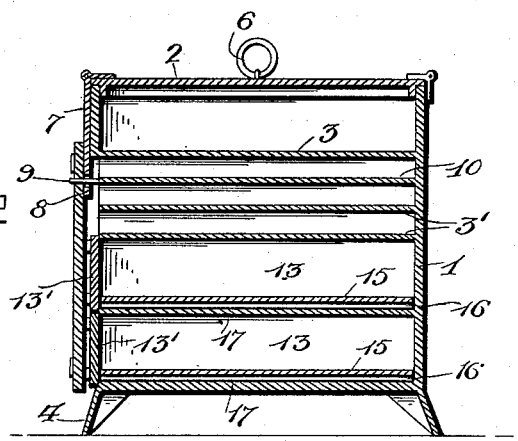
Figure 3:
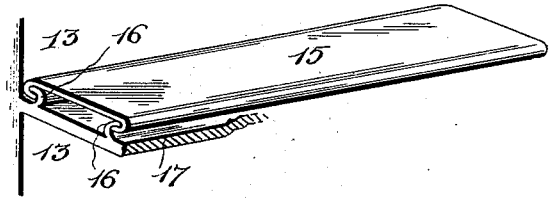

Figure 1 is a perspective view of a cake-safe embodying my invention. Fig. 2 is a vertical section of the same; and Fig. 3 is a detail perspective view, partly in section, of one of the trays and a portion of the box or safe.

1 denotes a rectangular box or safe provided with a hinged cover 2 and a fixed horizontal partition 3 and supported upon short legs 4 4. The sides of the safe are provided with handles 5 and the cover 2 with a ring or eye 6 for conveniently raising the cover and also to provide a means for suspending the safe when desirable. The front edge of the cover 2 is also provided with a hinged hasp 7, the free end of which is formed with an eye 8, which extends over a stud-pin 9, fixed in the front edge of the tray-shelf 10, so that when the door 12 is closed and locked it will also confine the hasp 7 and prevent the cover being raised.

3' 3' denote duplicate shelf-trays arranged parallel with the top tray 3, and 13 13 denote a series of compartments each of which is provided with an individual air-tight door 13', which is locked by a button 14, and each compartment is also provided with a sliding tray 15, which has a sliding engagement with the parallel ribs 16 16 on the bottom 17 of the compartment.

The cake is placed on the tray 15, which is then slid back into the compartment, and when it is desired to cut the cake the door of that particular compartment is opened without admitting air or exposing the contents of the remaining compartments.

In practice I prefer to make the safe or canister of aluminium or any other suitable sheet metal attractively ornamented to cater to the popular taste, and it may be made in various sizes to meet the wants of the housekeeper.

The accompanying drawings show my invention in the best form now known to me; but many changes in the details might be made within the skill of a good mechanic without departing from the spirit of my invention as set forth in the claims at the end of this specification.

Having thus fully described my invention, what I claim, and desire to secure by Letters Patent of the United States, is—

1. A cake safe or canister, comprising a rectangular box provided with horizontal trays 3' 3', the former being provided with a stud-pin 9, the cover 2 hinged to the top of said box, the hasp 7 provided with an orifice 8 to receive said pin, and the door 12 adapted to lock said hasp in place, substantially as and for the purpose set forth.

2. A cake safe or canister, comprising a rectangular box formed with a horizontal partition 3 and a series of compartments 13, an individual door for each compartment, a tray having a sliding engagement with the bottom of each compartment, and a door common to all the compartments, a hinged cover and a hasp carried by said cover and extending between the common door and the box, substantially as and for the purpose set forth.

In testimony whereof I have hereunto set my hand in presence of two subscribing witnesses.

NELLIE E. RAND.

Witnesses:
 D. M. RAND,
 M. R. BECK.